United States Patent
Conklin et al.

(10) Patent No.: US 12,127,510 B2
(45) Date of Patent: Oct. 29, 2024

(54) STRESS-ADAPTIVE IRRIGATION AND FERTIGATION

(71) Applicant: RESPONSIVE DRIP IRRIGATION, LLC, Bradenton, FL (US)

(72) Inventors: David A. Conklin, Bradenton, FL (US); Janice K. Gould, Bradenton, FL (US); Tam M. Le, Scottsdale, AZ (US)

(73) Assignee: Responsive Drip Irrigation, LLC, Bradenton, FL (US)

(*) Notice: Subject to any disclaimer, the term of this patent is extended or adjusted under 35 U.S.C. 154(b) by 246 days.

(21) Appl. No.: 17/613,019

(22) PCT Filed: Jul. 16, 2020

(86) PCT No.: PCT/US2020/042282
§ 371 (c)(1),
(2) Date: Nov. 19, 2021

(87) PCT Pub. No.: WO2021/011746
PCT Pub. Date: Jan. 21, 2021

(65) Prior Publication Data
US 2022/0217928 A1  Jul. 14, 2022

Related U.S. Application Data

(60) Provisional application No. 62/874,882, filed on Jul. 16, 2019.

(51) Int. Cl.
*A01G 25/06* (2006.01)
*A01C 23/04* (2006.01)

(52) U.S. Cl.
CPC ............ *A01G 25/06* (2013.01); *A01C 23/042* (2013.01)

(58) Field of Classification Search
CPC .............................. A01G 25/06; A01C 23/042
See application file for complete search history.

(56) References Cited

U.S. PATENT DOCUMENTS

| | | |
|---|---|---|
| 3,902,825 A | 9/1975 | Quillen |
| 4,538,377 A | 9/1985 | Thornton |
| 4,755,842 A | 7/1988 | Gardner et al. |

(Continued)

FOREIGN PATENT DOCUMENTS

| | | | | |
|---|---|---|---|---|
| WO | WO-2018055505 A1 | * | 3/2018 | |
| WO | WO-2018071883 A1 | * | 4/2018 | ............. A01G 25/02 |

OTHER PUBLICATIONS

Lomax et al., Emission Characteristics of Porous Tubing, Agricultural Water Management, 1988, pp. 197-204, Elsevier Science Publishers B.V., Amsterdam, The Netherlands.

(Continued)

*Primary Examiner* — Brady W Frazier
*Assistant Examiner* — Alanna K Peterson
(74) *Attorney, Agent, or Firm* — Law Office of Steven R. Olsen, PLLC; Steven R. Olsen

(57) ABSTRACT

Embodiments of the invention are directed to a sub-surface irrigation system configured to operate in a plant-responsive mode, and further configured to make certain adaptations in response to plant stress. Stress adaptations may include, for example, selectively increasing source pressure of irrigation fluid, heating or chilling the irrigation fluid, and/or injecting fertilizer and/or non-fertilizer amendments into the irrigation fluid.

15 Claims, 10 Drawing Sheets

(56) References Cited

U.S. PATENT DOCUMENTS

| | | | |
|---|---|---|---|
| 5,097,861 | A | 3/1992 | Hopkins et al. |
| 7,532,954 | B2 | 5/2009 | Evelyn-Veere |
| 7,769,494 | B1 | 8/2010 | Simon et al. |
| 8,011,852 | B2 | 9/2011 | Gesser et al. |
| 8,200,368 | B2 | 6/2012 | Nickerson et al. |
| 8,434,697 | B1 | 5/2013 | Olt |
| 8,649,910 | B2 | 2/2014 | Nickerson et al. |
| 9,043,964 | B2 | 6/2015 | Nickerson et al. |
| 9,527,267 | B2 | 12/2016 | Gould et al. |
| 10,271,474 | B1 * | 4/2019 | Miller .................... A01G 25/06 |
| 2006/0112625 | A1 * | 6/2006 | McNeff ................ A01C 23/042 47/48.5 |
| 2006/0193695 | A1 | 8/2006 | Ranjan et al. |
| 2013/0199655 | A1 * | 8/2013 | Lee ........................ A01G 25/06 112/475.08 |
| 2015/0156975 | A1 | 6/2015 | Gould et al. |
| 2017/0064912 | A1 * | 3/2017 | Tabakman ............. A01G 31/06 |
| 2017/0238484 | A1 | 8/2017 | Arumugam |
| 2017/0339853 | A1 * | 11/2017 | Sun .......................... A01G 7/00 |
| 2019/0191642 | A1 * | 6/2019 | Mueller ................. A01G 25/06 |

OTHER PUBLICATIONS

Dong et al., Effect of Irrigation Timing on Root Zone Soil Temperature, Root Growth and Grain Yield and Chemical Composition in Corn, Argronomy, May 19, 2016, 6, 34, MDPI, Basel, Switzerland.

Rain Bird, ESP-SMTe Controller U.S. Environmental Protection Agency WaterSense Approved, Brochure D40468EO (admitted prior art).

U.S. Environmental Protection Agency, WaterSense Labeled Weather-Based Irrigation Controllers, Jul. 2012, brochure, available at: http:www.epa.gov/watersense.

* cited by examiner

STRESS-ADAPTIVE IRRIGATION AND FERTIGATION

BACKGROUND

Field of Invention

The invention relates generally to plant irrigation. More particularly, but not by way of limitation, embodiments of the invention provide systems and methods for stress-adaptive irrigation and fertigation.

Description of the Related Art

Various systems and methods for plant irrigation and fertigation are known. Irrigation refers to controlled delivery of water; fertigation generally means the injection of fertilizer or other amendment into an irrigation system. As used herein, irrigation may include fertigation.

Various stress conditions are known to damage plants and reduce crop yields. Many irrigation systems and methods fail to adequately compensate for such stresses. Moreover, known methods that merely alter an irrigation schedule in response to perceived stress, for example by increasing an irrigation duration in an above-ground sprinkler system, are not generally effective in sub-surface drip irrigation (SDI) systems. Improved stress-adaptive irrigation systems and methods are needed.

SUMMARY OF THE INVENTION

Embodiments of the invention are directed to a sub-surface irrigation system configured to operate in a plant-responsive mode, and further configured to make certain adaptations in response to plant stress. Stress adaptations may include, for example, selectively increasing source pressure of irrigation fluid, heating or chilling the irrigation fluid, and/or injecting fertilizer and/or non-fertilizer amendments into the irrigation fluid. Alternative embodiments, and their advantages, will be described below.

DETAILED DESCRIPTION

Figure 1:
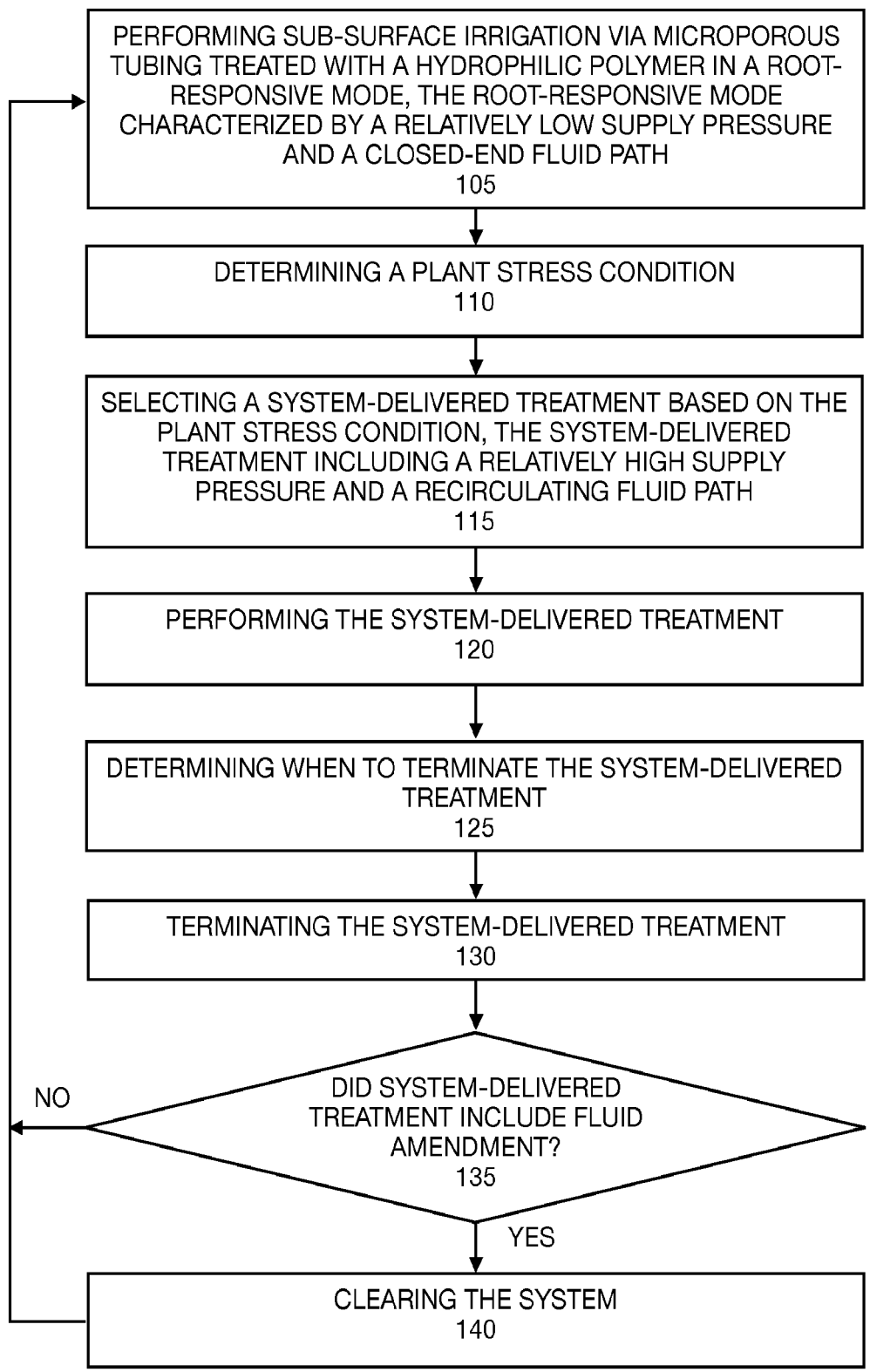
FIG. 1 is a flow diagram of a method for irrigation, according to an embodiment of the invention.

Embodiments of the invention are described below with reference to the drawings. Such embodiments are meant to be illustrative and not restrictive. The drawings are not to scale. Certain features illustrated in the drawings may be exaggerated in size, and other features may be omitted altogether, for clarity.

The following sections begin with a review of some environmental factors that can be monitored in an effort to assess environmental stress. The description below begins with an overview of plant stress. This document then describes an irrigation method (with reference to FIG. 1), exemplary microporous irrigation tubing (with reference to FIGS. 2, 3A, and 3B), exemplary irrigation systems (with reference to FIGS. 4-8), and methods for using such systems (with reference to FIGS. 9A, 9B, 10A, and 10B).

Section titles are used below for organizational convenience. The description of any claimed feature is not necessarily limited to any section of this specification.

Plant Stress

Plant stressors result from non-ideal growth conditions that increase the demands on the plant. Abiotic stressors (environmental stressors) are naturally occurring, inanimate factors such as: intense sunlight, high winds, extreme temperatures (hot or cold), drought, flooding, herbicides, pesticides, and poor soil conditions, for example, salinity, acidity, lack of nutrients (macro and micro), and heavy metals. Lesser-known abiotic stressors generally occur on a smaller scale. They include: poor edaphic conditions like rock content and pH levels, high radiation, compaction, and contamination. Any of these stressors can negatively influence plant development and crop productivity. Abiotic stress is considered the most harmful factor concerning the growth and productivity of crops. Abiotic stressors are most harmful when they occur together, in combinations of abiotic stress factors, such as arid, desert climates.

Biotic stressors include living disturbances such as fungi, bacteria, insects, and weeds. Viruses also cause biotic stress to plants. Fungi cause more diseases in plants than any other biotic stress factor. Microorganisms can cause plant wilt, leaf spots, root rot, or seed damage. Insects can cause severe physical damage to plants. Insects can also spread viruses and bacteria from infected plants to healthy plants. Weeds inhibit the growth of desirable plants by competing for space and nutrients.

A plant's first line of defense against abiotic and biotic stress is in its roots. If the soil holding the plant provides sufficient water and nutrients in response to plant needs, and is otherwise healthy and biologically diverse, the plant will have a higher chance of surviving stressful conditions above ground. Embodiments of the invention monitor plant stressors and provide an appropriate intervention at the rhizosphere to minimize a variety of plant stressors.

Exemplary Method for Irrigation

FIG. 1 is a flow diagram of a method for irrigation, according to an embodiment of the invention. As shown therein, the process begins in step 105 by performing sub-surface irrigation via microporous tubing treated with a hydrophilic polymer in a root-responsive mode, the root-responsive mode characterized by a relatively low supply pressure (to the tubing) and a closed-end fluid path. Such an irrigation mode is extremely water-efficient, and is the preferred irrigation mode when plants are not under stress.

The process then determines a plant stress condition in step 110. Step 110 may be performed for instance, by comparing sensor data to predetermined threshold, by visual inspection, and/or by performing plant tissue or soil analysis. For example, readings from ambient temperature and/or ground temperature sensors can be compared to predetermined threshold values to determine that an elevated temperature condition exists. Likewise, wind speed data from an anemometer can be compared to predetermined thresholds. Temperature and wind data are preferably integrated over time to model transpiration effects more precisely. As a further example of step 110, visual inspection, whether performed or aided by humans, local imaging sensors, or overhead assets, can reveal leaf discoloration, plant wilting, lodging (displacement of stems or roots), disease, pest infestation, the presence of weeds, or other evidence of present or emerging plant stressors. Data from subsurface salinity sensors can be compared to a known salt tolerance level for a given plant type. Soil analysis can reveal, for instance, a lack of beneficial microbes in the oil, or the presence of harmful fungi.

In step 115, the process selects a system-delivered treatment based on the plant stress condition, the system-delivered treatment including a relatively high supply pressure and a recirculating fluid path. In the case of temperature-related stress, for example, the selected system-delivered treatment may include chilling or heating the irrigation fluid, and may also include adding a surfactant to the irrigation fluid. For wind stress not accompanied by temperature extremes, the process may select the relatively high supply pressure and the recirculating path alone. When the plant stress condition was determined in step 110 to be a soil condition and/or a mineral imbalance the process may select an agrochemical additive to amend the irrigation fluid to correct the soil deficit or problem in step 115. Likewise, where biotic stressors are determined to be present, the process may select, for instance, from one or more biological amendments, root/soil activators, organic additive, or pesticides.

The relatively high supply pressure (preferred in all treatment cases), and surfactant (when added), will tend to increase the emission rate of irrigation fluid from the tubing to the root zone. The recirculation path (also preferred in all treatment cases) will facilitate a more homogeneous delivery (in terms of temperature and amendment concentration) of the irrigation fluid along the functional length of the sub-surface tubing.

The process performs the (above-described) system-delivered treatment in step 120, and determines when to terminate the system-delivered treatment in step 125. System-delivered treatment is intended to be temporary. The determination in step 125 could be based on a predetermined duration (for example, based on treatment type), on a calculated duration (for instance, based on a severity of determined stressor(s)), or based on evidence of reduced stress (e.g., improvements in data, observations, or analysis relied upon in step 110).

As indicated by conditional step 135, if the system-delivered treatment included a fluid amendment, then the process advances to step 140; otherwise the process returns directly to step 105. Clearing step 140 preferably includes supplying the irrigation fluid at the relatively high supply pressure, and using the recirculation fluid path, but without addition of amendments. One exception is that where the system-delivered treatment included amendment with a surfactant, clearing step 140 preferably includes amendment with a thickening agent to counteract the effects of the surfactant on fluid emission.

Microporous Irrigation Tubing Examples

Figure 2:
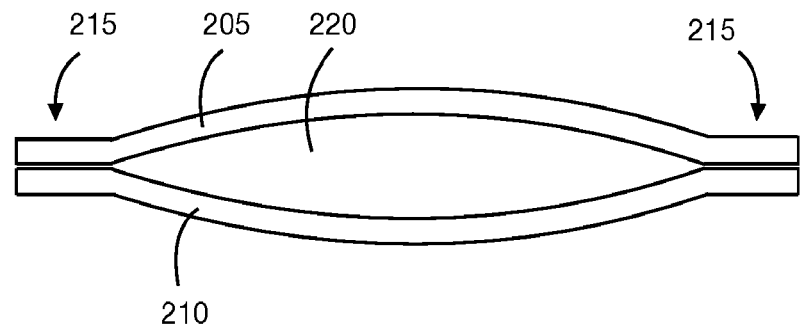
FIG. 2 is an assembly view of a delivery tube, illustrated in cross-section, according to an embodiment of the invention.
Figures 3A, 3B:
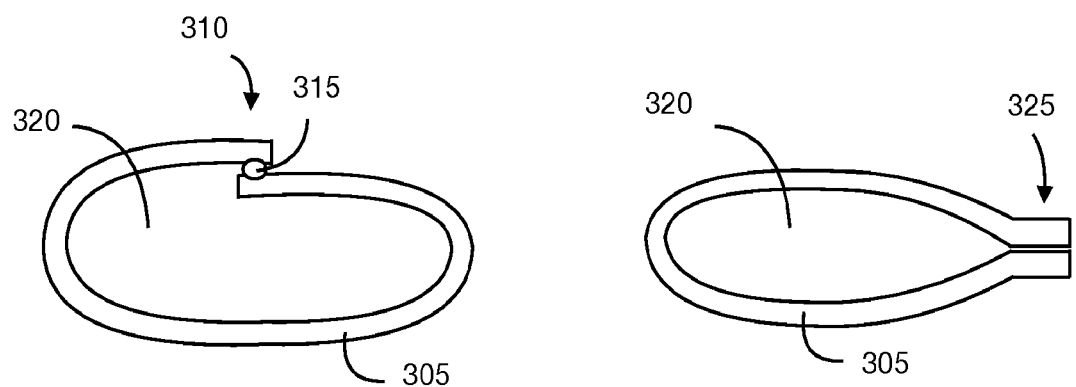
FIG. 3A is an assembly view of a delivery tube, illustrated in cross-section, according to an embodiment of the invention.
FIG. 3B is an assembly view of a delivery tube, illustrated in cross-section, according to an embodiment of the invention.

FIGS. 2, 3A, and 3B are each an assembly view of a delivery tube, illustrated in cross-section, according to alternative embodiments of the invention. As shown in FIG. 2, a microporous membrane 205 is welded along regions 215 to a backer 210 to form an irrigation tube having a lumen 220. The embodiments illustrated in FIGS. 3A and 3B each provide an irrigation tube without a backer 210. Instead, in these examples, a microporous membrane 305 is wrapped upon itself to form an irrigation delivery tube having a lumen 320. The embodiment in FIG. 3A includes a flat seam weld 310 with a bead 315; the embodiment in FIG. 3B includes a fin weld 325.

The microporous membrane 205, 305, may be, for instance, manufactured from polyethylene (PE), polypropylene (PP), polyethylene terephthalate (PET, a/k/a polyester) or other suitable material. As an example, the microporous membrane 205, 305, may be DuPont Tyvek™ or other non-woven or spun-bonded fabric. Preferably, the microporous membrane 205, 305, is treated (entirely or selectively) with a hydrophilic polymer to enhance responsiveness to root exudate.

For the tubing embodiment in FIG. 2, the backer 210 is preferably a less expensive material than the microporous membrane 205. The backer 210 is also preferably much less porous (i.e., effectively non-porous) compared to the microporous membrane 205. For thermal compatibility, where the microporous membrane 205 is PE, the backer 210 is preferably also manufactured from PE; where the microporous membrane 205 is PP, the backer 210 is preferably PP; and where the microporous membrane is 205 is PET, the backer 210 may be PET. The surface area of the microporous membrane 205 and the surface area of the backer 210 need not be equal for any given length of tubing.

Other microporous irrigation tubing configurations and weld types are possible, and could also be used in combination with one or more stress-adaptative systems and methods disclosed herein. Moreover, some features or embodiments may be equally applicable to surface and sub-surface applications of microporous irrigation tubing.

Exemplary Systems

Exemplary systems for performing the above method, and variants thereof, are described below with reference to FIGS. 4-8.

Figure 4:
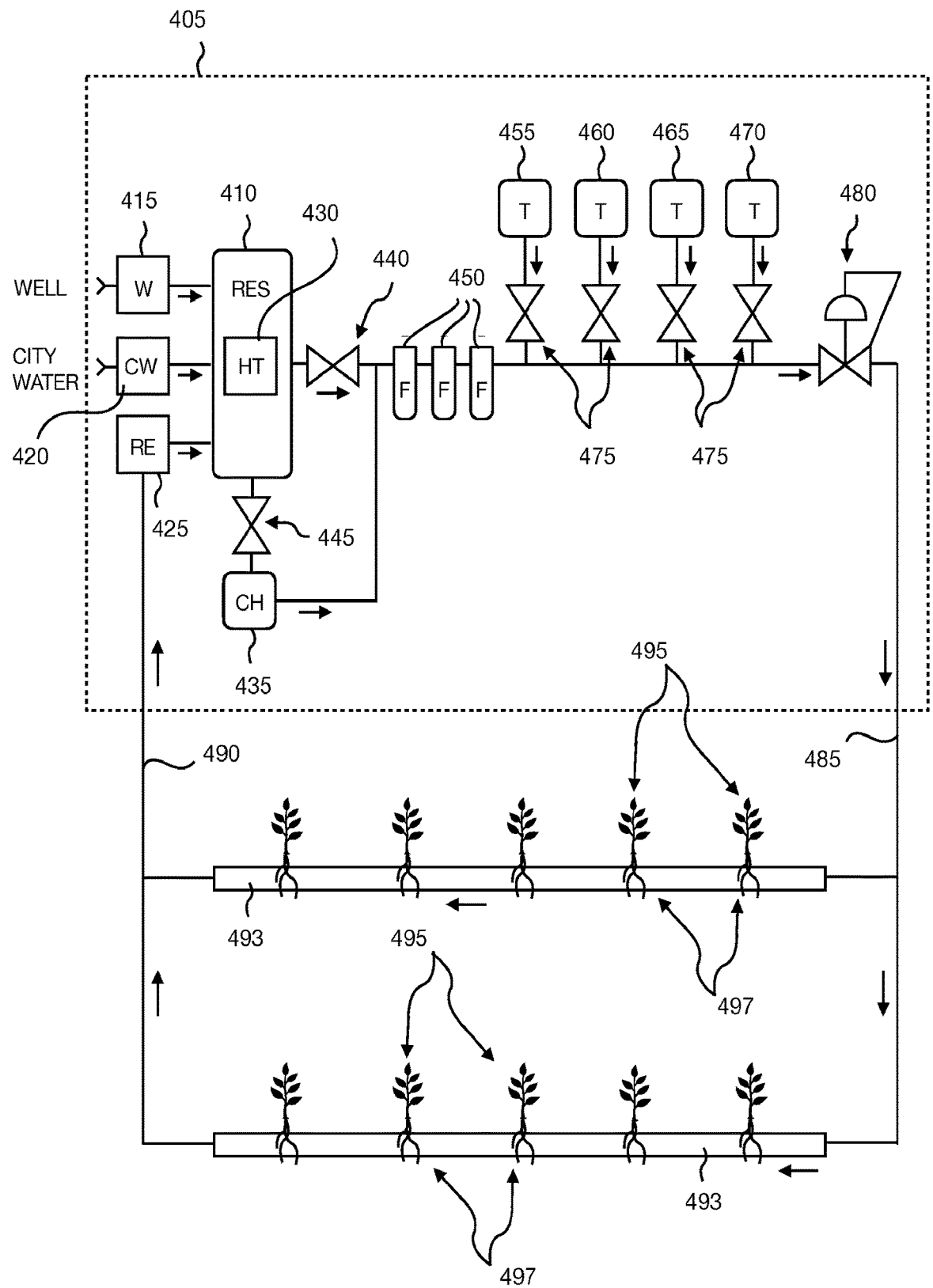
FIG. 4 is a schematic diagram of an irrigation system, according to an embodiment of the invention.

FIG. 4 is a schematic diagram of an irrigation and fertilization system, according to an embodiment of the invention. The embodiment illustrated in FIG. 4 might be applicable, for instance, to a large commercial farming operation. As shown therein, a supply system 405 feeds a header pipe 485 that is coupled to multiple sub-surface microporous irrigation delivery tubes 493. Multiple plants 495 have roots 497 within a functional distance of delivery tubes 493. The delivery tubes 493 could be constructed, for example, as described above with reference to FIG. 2, 3A, or 3B.

The supply system 405 includes a reservoir (RES) 410 coupled to receive fluid from well pump (W) 415, city water connection (CW) 420, and recirculation pump (RE) 425. Each of these reservoir 410 inputs could be coupled via a valve (not shown). In the illustrated embodiment, the reservoir 410 includes a heater (HT) 430. Valves 440, 445 are coupled to outputs of the reservoir 410. An in-line chiller (CH) 435 is coupled to an output of valve 445.

Suitable recirculation pumps 425 are manufactured, for instance, by Blue Torrent Pool Products, Floject, Flotec, and other suppliers, according to application requirements. The heater 430 could be, for example, a glass-encased electric heating element, although geo-thermal or other heating modalities could also be applied according to design choice. The in-line chiller 435 could be or include, for instance, a TropiCool®, Heatwave, GBB (Great Big Bopper by Aqua-Cal), or other water-source heat pump.

In the supply system 405, the reservoir 410 output is further coupled to filters (F) 450, and also coupled to tanks (T) 455, 460, 465, and 470 and to pressure regulator 480. Any of the tanks 455, 460, 465, 470 could include a pump (not shown).

The pressure regulator 480 is preferably configured to output a relatively low-pressure fluid flow from the supply system 405 to the header pipe 485, for instance for a setting within the range of 0.5-5.0 PSI, for compatibility with the microporous delivery tubes 493. An exemplary regulator 480 is the Model 3865 diaphragm regulator manufactured by Ziggity Systems, Inc. The desired pressure setting for such an adjustable pressure regulator may vary accordingly to properties of the delivery tubes 493. In alternative embodiments, other pressure settings and/or other regulators 480 could be used.

In operation, the reservoir 410 is selectively supplied by well pump 415, city water connection 420, and/or recirculation pump 425. Fluid is selectively heated in the reservoir 410 via heater 430; fluid is selectively cooled at an output of the reservoir 410 using in-line chiller 435 via operation of valves 440, 445. In some modes of operation, fluid in supply system 405 is not heated or chilled. Flow through filters 450 may also be selective (for instance via additional valves, not shown) according to fluid amendment and recirculation status. Generally, each tank 455, 460, 465, and 470 could contain a unique type of fluid amendment. For example, tank 455 could contain a fertilizer, tank 460 could contain a surfactant, tank 465 could contain a thickening agent, and tank 470 could contain particulate for a suspended load. Contents (or a portion) of each tank 455, 460, 465 and 470 can be selectively added to irrigation fluid in the supply system 405, alone or in any combination, via operation of a corresponding valve 475. Regulator 480 controls a supply pressure of irrigation fluid to header pipe 485 and delivery tubes 493. During selective recirculation (i.e., according to status of the recirculation pump 425), irrigation fluid is returned to the supply system 405 via recirculation path 490.

The supply system 405 may be operated in alternative modes. For instance, in a normal low-pressure plant-responsive mode, the heater 430 and chiller 435 may be inactive, valve 440 may be open, valves 445 and 475 may be closed, the regulator 480 may be adjusted for a relatively low pressure (for instance 1.5 psi), and the recirculation pump 425 could be turned off. In a treatment mode, the heater 430 or chiller 435 may be on, one or more valves 475 may be open, the regulator 480 may be set at a relatively high pressure (for instance 5.0 psi), and the recirculation pump 425 may be on.

Variations to the system illustrated in FIG. 4 and described above are possible. For instance, some embodiments do not require well pump 415, city water connection 420, or recirculation pump 425. In alternative embodiments, heater 430 could be placed in-line, external to the reservoir 410. The heater 430 could be combined with the chiller 435, for instance in a heat pump unit. The number and sequential placement of filters 450 and tanks 455, 460, 465, and 470 could vary. In an automated or semi-automated embodiment, the supply system 405 could include a controller; the controller could receive signals from one or more environmental sensors, and the controller could output control signals to the recirculation pump 425, heater 430, in-line chiller 435, valves 440, 445, 475, and/or pressure regulator 480.

Figure 5:
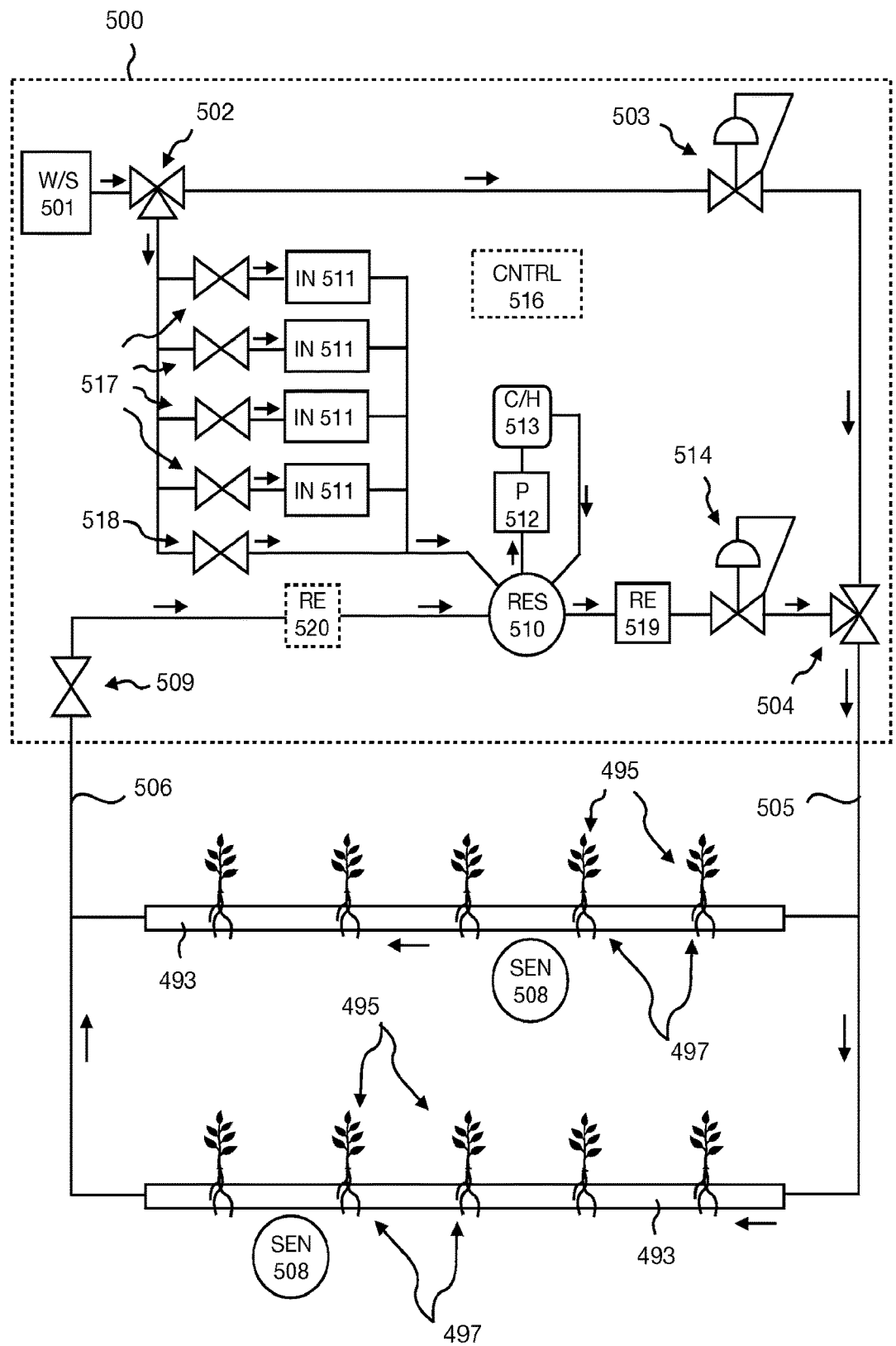
FIG. 5 is a schematic diagram of an irrigation system, according to an embodiment of the invention.

FIG. 5 is a schematic diagram of an irrigation system, according to an embodiment of the invention. As shown therein, a supply system 500 feeds a header pipe 505 that is coupled to multiple sub-surface microporous irrigation delivery tubes 493. Multiple plants 495 have roots 497 within a functional distance of delivery tubes 493. The delivery tubes 493 could be constructed, for example, as described above with reference to FIG. 2, 3A, or 3B. Each of the delivery tubes is fluidically coupled to the footer 506. Sensors 508 could be or include, for example, in-ground temperature and/or salinity sensors.

Supply system 500 is configured so that a pressurized water source (W/S) 501 can be serially coupled to a diverter 502, a first pressure regulator 503 (which is set for a relatively low pressure output, for instance 1.0 psi), a diverter 504, and the header pipe 505. For some applications, RDI model APR-Z053 may be suitable for the first pressure regulator 503.

Diverter 502 is also coupled to multiple injector valves 517 and bypass valve 518. Each of the injector valves 517 is serially coupled to an input of a corresponding inline injector 511. Inline injectors 511 are preferably configured for accurate addition of soluble fertilizer or other amendments. Outputs of the inline injectors 511 are coupled to an output of the bypass valve 518 and to a first input of a reservoir 510. A first output of the reservoir 510 is serially coupled to a pump 512 and chiller/heater 513. In alternative embodiments, the chiller/heater 513 could be a chiller, or a heater, instead of a combined chiller/heater. An output of the chiller/heater 513 is coupled to a second input of the reservoir 510. A second output of the reservoir 510 is serially coupled to a recirculation pump 519, a second pressure regulator 514 (which is set for a relatively high pressure output, for instance 5.0 psi) and the diverter 504. For some applications, RDI model APR-M758 may be suitable for the second pressure regulator 503. The footer 506 is serially coupled to the recirculation valve 509 and a third input to the reservoir 510.

Controller 516 is an optional component, according to design choice. If included, controller 516 could be configured to receive data from the sensors 508, and could control the operation of any one or more components illustrated as part of supply system 500 (with the exception of directly controlling the pressurized water source 501). Recirculation pump 520 is also an optional component, based on application needs. Recirculation pump 520 may be required, for instance, if the reservoir 510 is disposed at a much higher elevation than the footer 506.

In a normal (and most water-efficient) mode, unamended irrigation fluid can be supplied by the supply system 500 to the header pipe 505 at a relatively low pressure and with a termination point at the recirculation valve 509.

In the case of system-delivered treatment in response to plant stress, the supply system 500 can be configured to supply irrigation fluid to the header pipe 505 at a relatively high pressure, with or without amendment from one or more inline injectors 511, and with or without heating or cooling enabled by the chiller/heater 513. Operation during system-delivered treatment preferably includes a recirculation path through an open recirculation valve 509, and with the aid of recirculation pump 519 (and recirculation pump 520, if applicable).

Figure 6:
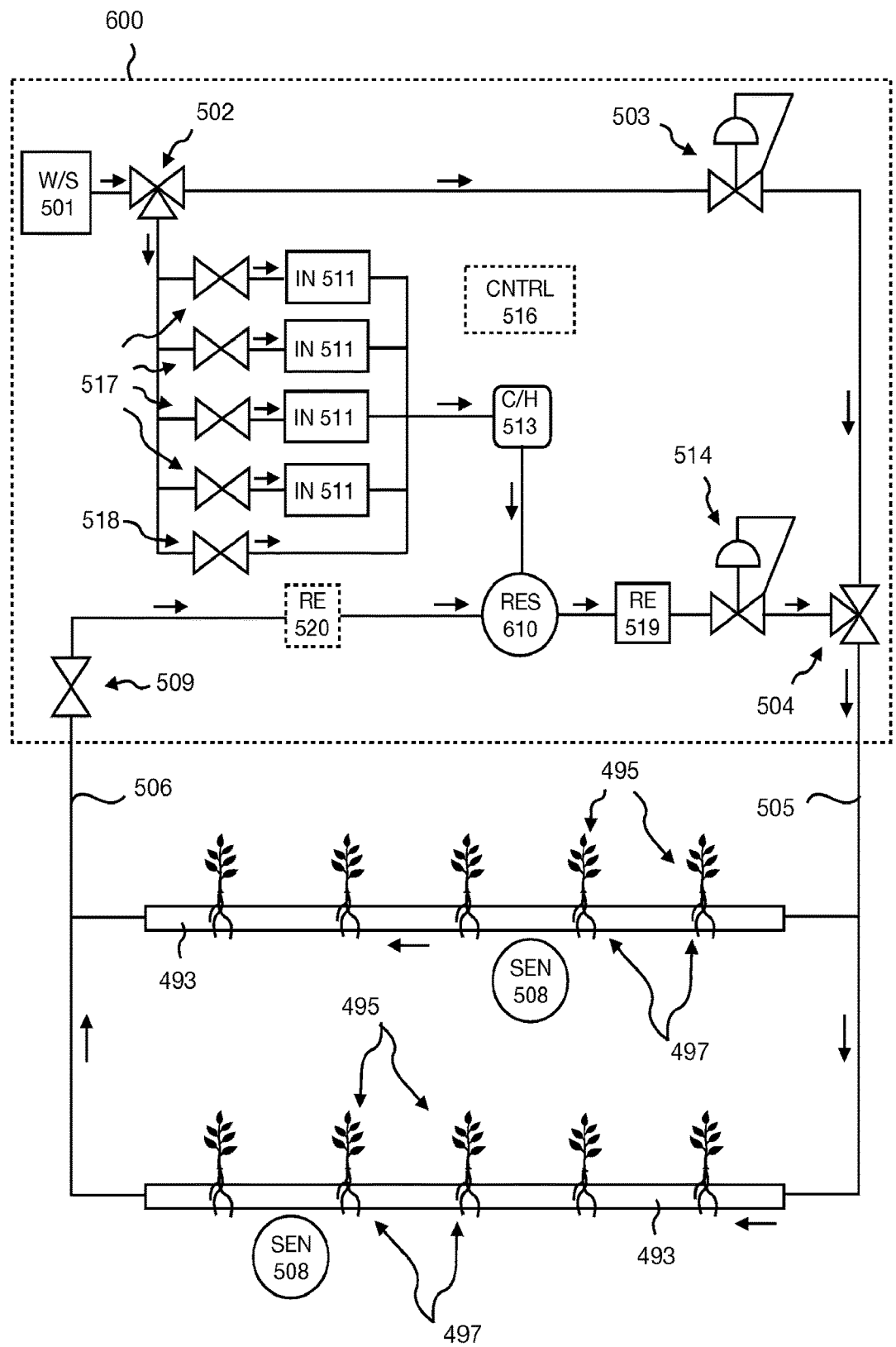
FIG. 6 is a schematic diagram of an irrigation system, according to an embodiment of the invention.

FIG. 6 is a schematic diagram of an irrigation system, according to an embodiment of the invention. The irrigation system illustrated in FIG. 6 is substantially similar to the irrigation system illustrated in FIG. 5 except for minor differences between supply system 600 and the supply system 500. In particular, supply system 600 deletes the pump 512, replaces reservoir 510 with reservoir 610, and couples the chiller/heater inline. Supply system 600 requires that selected inline injectors 511 can provide sufficient flow for the selected chiller/heater 513. With that caveat, the supply system 600 can supply the same "normal" and "system-delivered treatment" modes described above with reference to supply system 500. As noted above, in alternative embodiments, the chiller/heater 513 could be a chiller, or a heater, instead of a combined chiller/heater.

Figure 7:
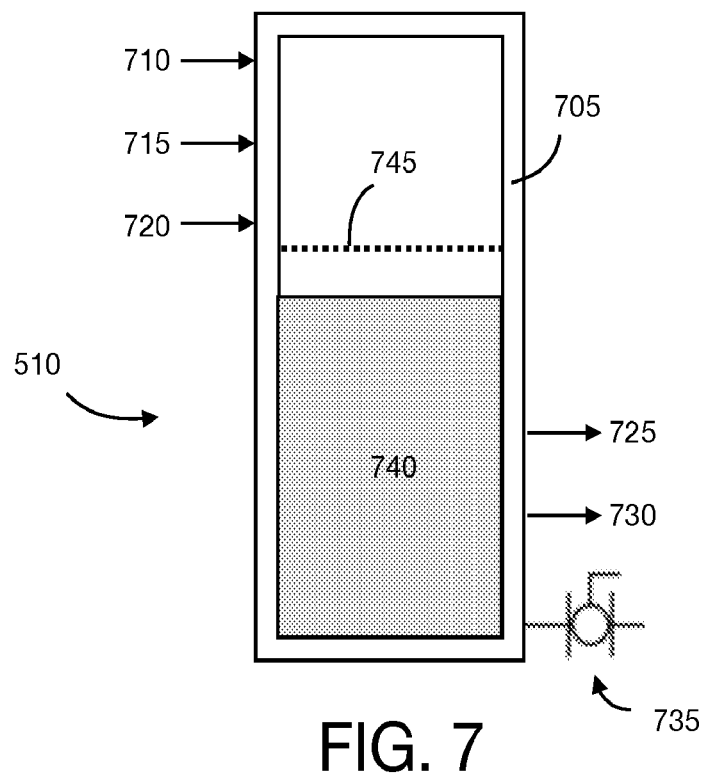
FIG. 7 is a schematic diagram for the reservoir illustrated in FIG. 5.

FIG. 7 is a schematic diagram for the reservoir 510 illustrated in FIG. 5. Reservoir 510 includes thermally-insulated walls 705, three inputs 710, 715, 720, two outputs 725, 730, and a drain 735. Fluid 740 is maintained below a predetermined fill line 745, for instance with aid of a float switch (not shown). With reference to FIG. 5: input 710 may be from outputs of the inline injectors 511 and bypass valve 518; input 715 may be from the chiller/heater 513; and input 720 may be coupled to the recirculation valve 509. Output 725 may be to the pump 512, and output 730 may be to the recirculation pump 519.

Figure 8:
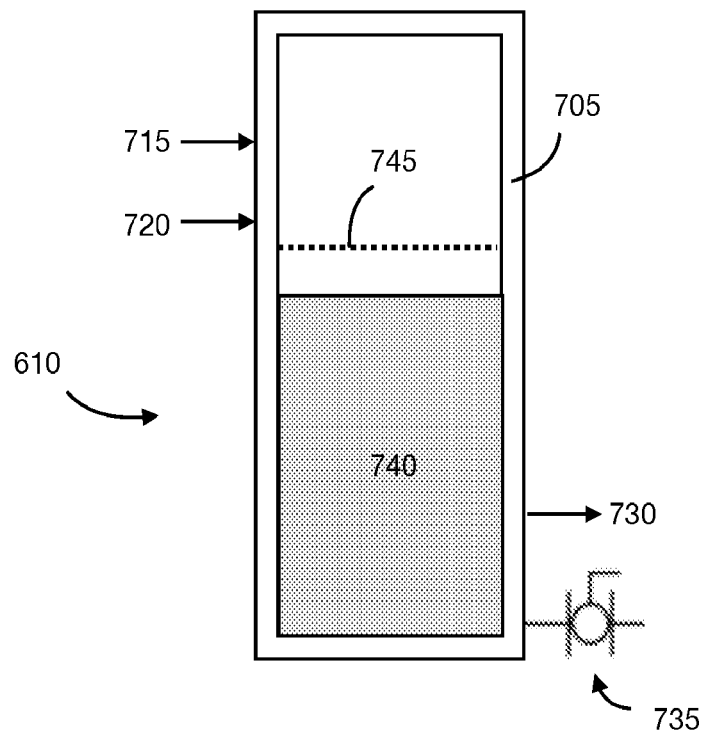
FIG. 8 is a schematic diagram for the reservoir illustrated in FIG. 6.

FIG. 8 is a schematic diagram for the reservoir 610 illustrated in FIG. 6. Compared to reservoir 510, reservoir 610 deletes input 710 and output 725.

Figure 9A:
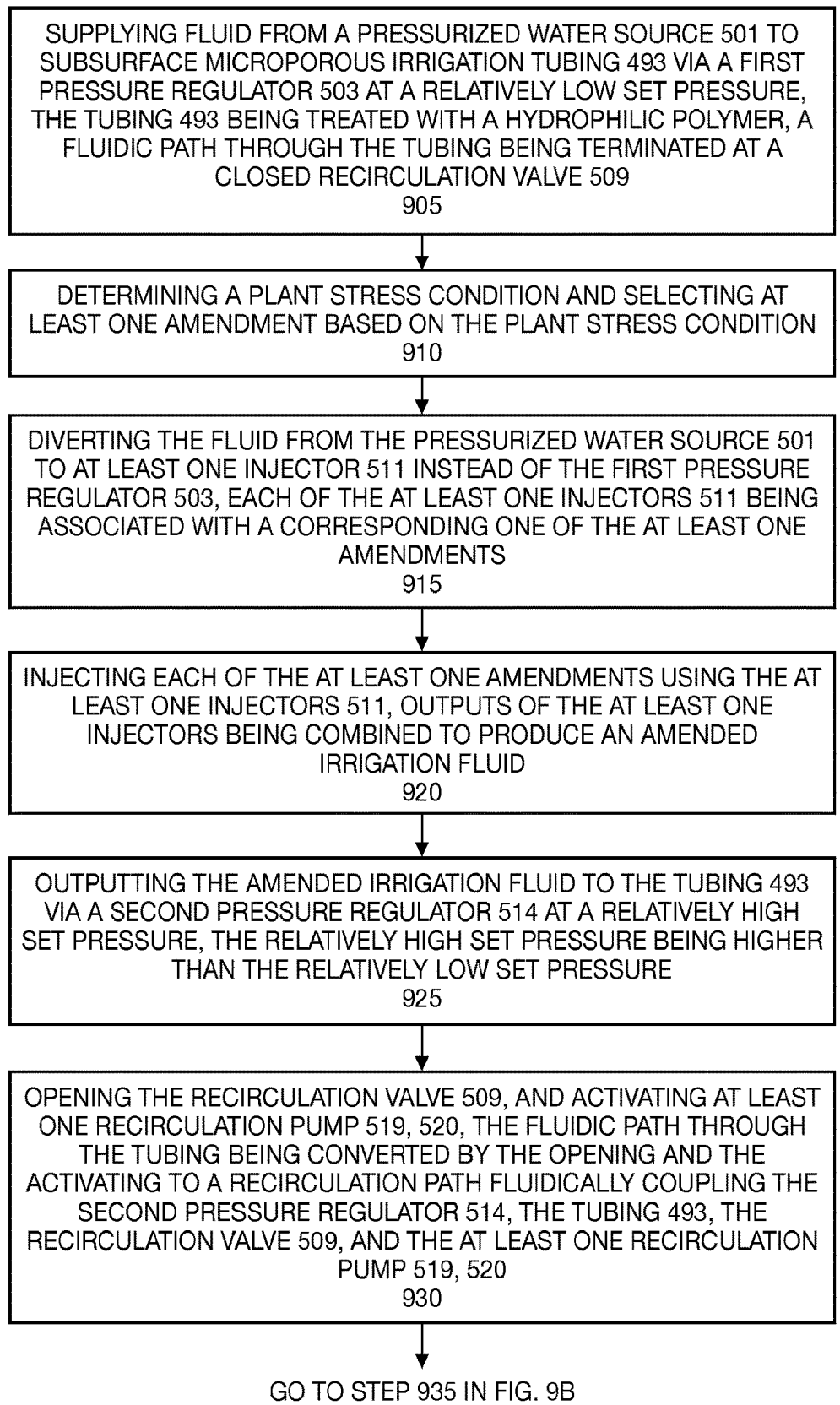
FIGS. 9A and 9B are a flow diagram of a method for using the system illustrated in FIG. 5 or 6, according to an embodiment of the invention.
Figure 9B:
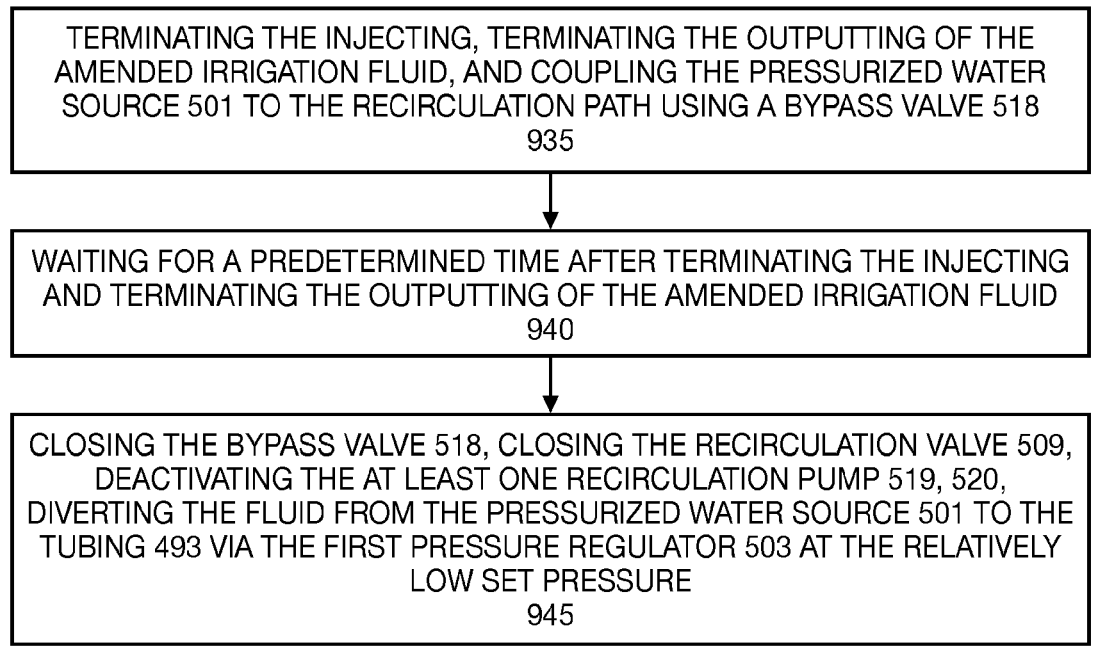

FIGS. 9A and 9B are a flow diagram of a method for using the system illustrated in FIG. 5 or 6, according to an embodiment of the invention. Step 905 is supplying fluid from a pressurized water source 501 to subsurface microporous irrigation tubing 493 via a first pressure regulator 503 at a relatively low set pressure, the tubing 493 being treated with a hydrophilic polymer, a fluidic path through the tubing being terminated at a closed recirculation valve 509. Step 910 is determining a plant stress condition and selecting at least one amendment based on the plant stress condition. Step 915 is diverting the fluid from the pressurized water source 501 to at least one injector 511 instead of the first pressure regulator 503, each of the at least one injectors 511 being associated with a corresponding one of the at least one amendments. Step 920 is injecting each of the at least one amendments using the at least one injectors 511, outputs of the at least one injectors being combined to produce an amended irrigation fluid. Step 925 is outputting the amended irrigation fluid to the tubing 493 via a second pressure regulator 514 at a relatively high set pressure, the relatively high set pressure being higher than the relatively low set pressure. Step 930 is opening the recirculation valve 509, and activating at least one recirculation pump 519, 520, the fluidic path through the tubing being converted by the opening and the activating to a recirculation path fluidically coupling the second pressure regulator 514, the tubing 493, the recirculation valve 509, and the at least one recirculation pump 519, 520. Step 935 is terminating the injecting, terminating the outputting of the amended irrigation fluid, and coupling the pressurized water source 501 to the recirculation path using a bypass valve 518. Step 940 is waiting for a predetermined time after terminating the injecting and terminating the outputting of the amended irrigation fluid. Step 945 is closing the bypass valve 518, closing the recirculation valve 509, deactivating the at least one recirculation pump 519, 520, diverting the fluid from the pressurized water source 501 to the tubing 493 via the first pressure regulator 503 at the relatively low set pressure.

Accordingly, in embodiments of the invention, amendments introduced during system-delivered treatments are cleared from subsurface irrigation tubing by supplying only unamended fluid at relatively high pressure in the recirculation path for a predetermined time before returning to the relatively low-pressure and closed-ended root-responsive mode.

Figure 10A:
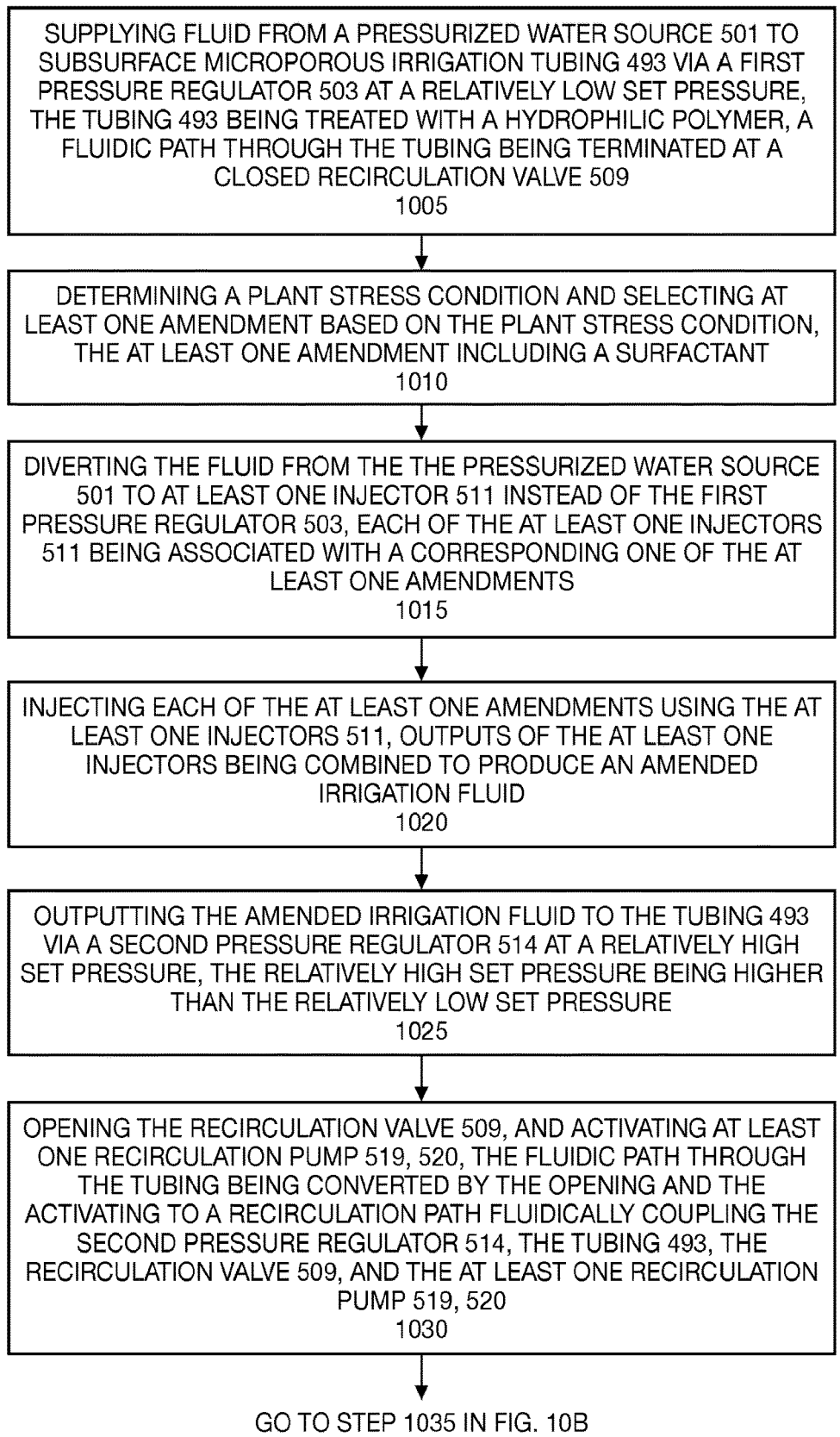
FIGS. 10A and 10B are a flow diagram of a method for using the system illustrated in FIG. 5 or 6, according to an embodiment of the invention.
Figure 10B:
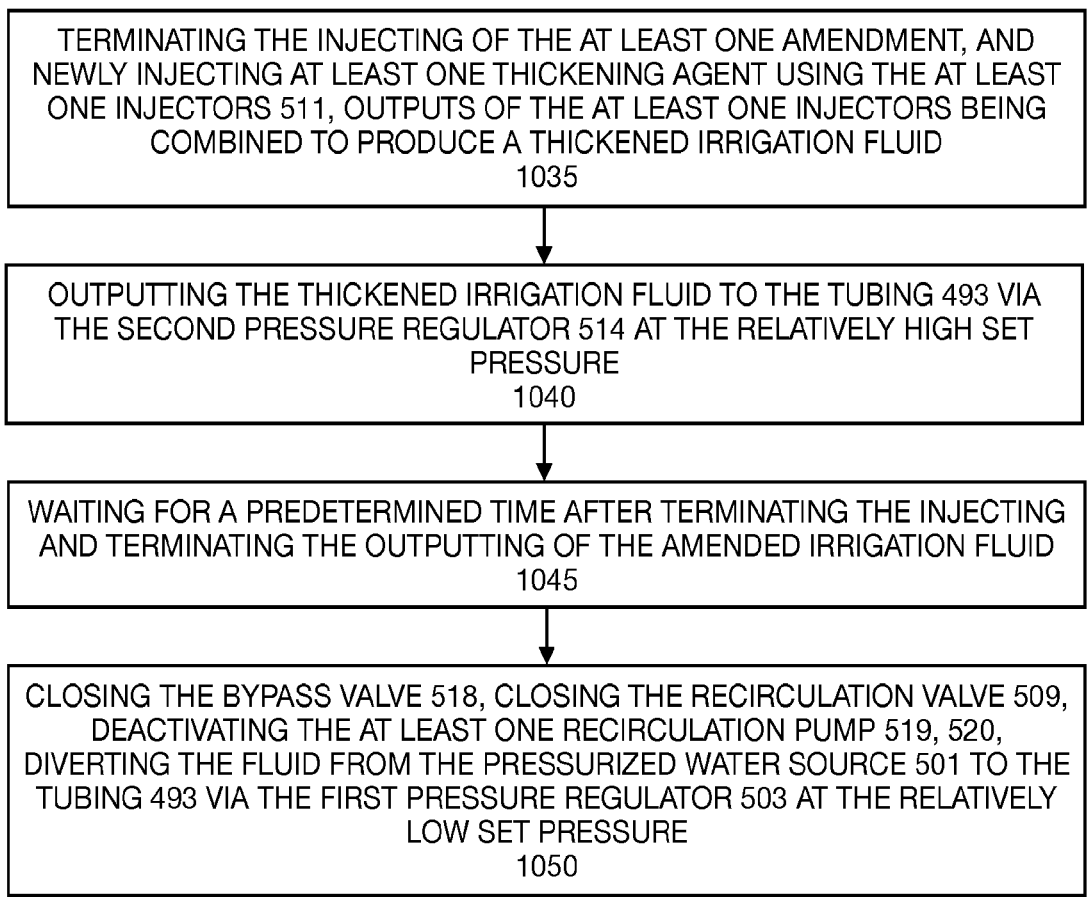

FIGS. 10A and 10B are a flow diagram of a method for using the system illustrated in FIG. 5 or 6, according to an embodiment of the invention. Step 1005 is supplying fluid from a pressurized water source 501 to subsurface microporous irrigation tubing 493 via a first pressure regulator 503 at a relatively low set pressure, the tubing 493 being treated with a hydrophilic polymer, a fluidic path through the tubing being terminated at a closed recirculation valve 509. Step 1010 is determining a plant stress condition and selecting at least one amendment based on the plant stress condition, the at least one amendment including a surfactant. Step 1015 is diverting the fluid from the the pressurized water source 501 to at least one injector 511 instead of the first pressure regulator 503, each of the at least one injectors 511 being associated with a corresponding one of the at least one amendments. Step 1020 is injecting each of the at least one amendments using the at least one injectors 511, outputs of the at least one injectors being combined to produce an amended irrigation fluid. Step 1025 is outputting the amended irrigation fluid to the tubing 493 via a second pressure regulator 514 at a relatively high set pressure, the relatively high set pressure being higher than the relatively low set pressure. Step 1030 is opening the recirculation valve 509, and activating at least one recirculation pump 519, 520, the fluidic path through the tubing being converted by the opening and the activating to a recirculation path fluidically coupling the second pressure regulator 514, the tubing 493, the recirculation valve 509, and the at least one recirculation pump 519, 520. Step 1035 is terminating the injecting of the at least one amendment, and newly injecting at least one thickening agent using the at least one injectors 511, outputs of the at least one injectors being combined to produce a thickened irrigation fluid. Step 1040 is outputting the thickened irrigation fluid to the tubing 493 via the second pressure regulator 514 at the relatively high set pressure. Step 1045 is waiting for a predetermined time after terminating the injecting and terminating the outputting of the amended irrigation fluid. Step 1050 is closing the bypass valve 518, closing the recirculation valve 509, deactivating the at least one recirculation pump 519, 520, diverting the fluid from the pressurized water source 501 to the tubing 493 via the first pressure regulator 503 at the relatively low set pressure.

Accordingly, in embodiments of the invention, the effects of surfactants introduced during system-delivered treatments are at least partially countered in from subsurface irrigation tubing by supplying water with a thickening agent at relatively high pressure in the recirculation path for a predetermined time before returning to the relatively low-pressure and closed-ended root-responsive mode.

CONCLUSION

Those skilled in the art can readily recognize that numerous variations and substitutions may be made in the invention, its use and its configuration to achieve substantially the same results as achieved by the embodiments described herein. For example, features described with reference to different embodiments in this application can be combined in ways not expressly described. Accordingly, there is no intention to limit the invention to the disclosed exemplary forms. Many variations, modifications and alternative constructions fall within the scope and spirit of the disclosed invention.

We claim:

1. A method for irrigating a plant, comprising the steps of:
   a) performing sub-surface irrigation via microporous tubing treated with a hydrophilic polymer in a root-responsive mode, the root-responsive mode using a first supply pressure and a closed-end fluid path;
   b) determining a plant stress condition;
   c) performing a treatment based on the plant stress condition, the treatment including a fluid amendment having a surfactant, the treatment using a second supply pressure and an unbroken recirculating fluid path, the second supply pressure being higher than the first supply pressure;
   d) terminating the treatment; and
   e) clearing the fluid amendment from the microporous tubing using a thickening agent to counteract effects of the surfactant.

2. The method of claim 1, wherein the microporous tubing is manufactured from polyester material.

3. The method of claim 1, wherein the microporous tubing is manufactured from polyethylene material.

4. The method of claim 1, wherein the microporous tubing is manufactured from polypropylene material.

5. The method of claim 1, wherein the plant stress condition is an external abiotic stressor on the plant.

6. The method of claim 1, wherein the plant stress condition is an external biotic stressor on the plant.

7. The method of claim 1, wherein the fluid amendment includes a fertilizer.

8. The method of claim 1, wherein the fluid amendment includes an agrochemical additive.

9. The method of claim 1, wherein the fluid amendment includes an organic additive.

10. The method of claim 1, wherein the clearing uses the second supply pressure for a predetermined time.

11. The method of claim 1, the clearing being performed using the unbroken recirculating fluid path.

12. A method for irrigating a plant, comprising the steps of:
    a) performing sub-surface irrigation via microporous tubing treated with a hydrophilic polymer in a root-responsive mode, the root-responsive mode using a first supply pressure and a closed-end fluid path;
    b) determining a type of external biotic stressor on the plant;
    c) performing a treatment based on the type of external biotic stressor, the treatment including a fluid amendment having a surfactant, the treatment using a second supply pressure and a recirculating fluid path, the second supply pressure being higher than the first supply pressure;
    d) terminating the treatment; and
    e) clearing the fluid amendment from the microporous tubing using a thickening agent to counteract effects of the surfactant.

13. The method of claim 12, wherein the microporous tubing is manufactured from at least one of a polyester material, a polyethylene material, and a polypropylene material.

14. The method of claim 12, wherein the fluid amendment includes at least one of an agrochemical additive and an organic additive.

15. The method of claim 12, the clearing being performed using the recirculating fluid path.

* * * * *